United States Patent

[11] 3,583,664

| [72] | Inventor | Ben F. Kalina<br>Box 377, Bowman, N. Dak. 58623 |
|---|---|---|
| [21] | Appl. No. | 825,126 |
| [22] | Filed | May 8, 1969 |
| [45] | Patented | June 8, 1971<br>Continuation-in-part of application Ser. No. 746,023, July 19, 1968, now abandoned. |

[54] ANTIDRIP SAUCER DEVICE
1 Claim, 7 Drawing Figs.

| [52] | U.S. Cl. | 248/346.1, 215/100.5 |
|---|---|---|
| [51] | Int. Cl. | A47b 43/04 |
| [50] | Field of Search | 248/346.1; 215/100.5 |

[56] References Cited
UNITED STATES PATENTS

| 132,808 | 11/1872 | Currier | 248/346.1 |
|---|---|---|---|
| 3,188,040 | 6/1965 | Eichler | 248/346.1 |
| 3,343,774 | 9/1967 | Pryor | 248/346.1 |

FOREIGN PATENTS

| 709,652 | 5/1931 | France | 248/346.1 |
|---|---|---|---|

*Primary Examiner*—Chancellor E. Harris
*Attorney*—Robert E. Kleve

ABSTRACT: The invention comprises an antidrip saucer for coffee cups having annular collars to surround the lower side edges of the cup, a center disclike base formed inwardly with the lower inner edges of the collar and a plurality of projecting ribs projecting upwardly from the said base and terminating below the upper edge of the collar for supporting the lower edge of the coffee cup.

PATENTED JUN 8 1971
3,583,664
SHEET 1 OF 2
FIG.2.
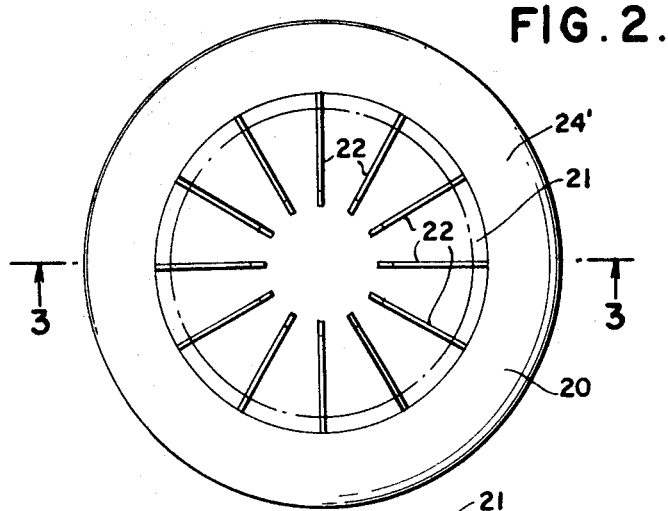
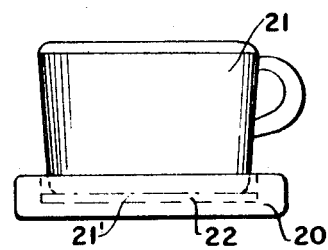
FIG.1.
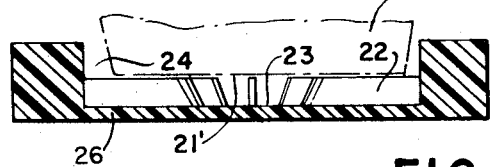
FIG.3.
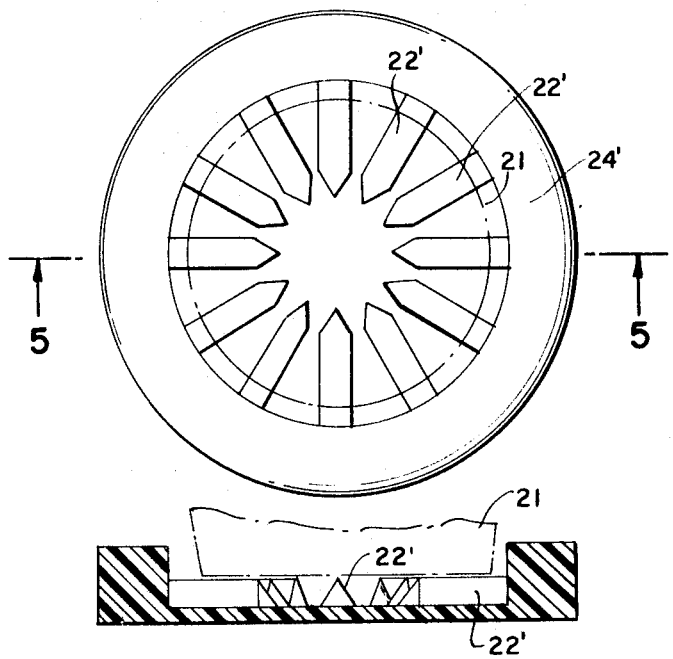
FIG.4.
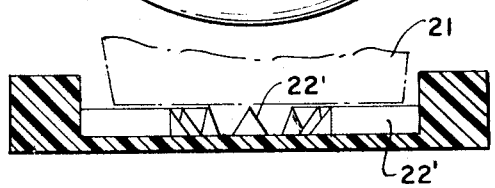
FIG.5.
INVENTOR
Ben F. Kalina
BY *Robert E. Kleve*
ATTORNEY INVENTOR
Ben F. Kalina
BY Robert E. Kleve
ATTORNEY

ANTIDRIP SAUCER DEVICE

This application is a continuation-in-part of my earlier copending Pat. application, Ser. No. 746,023, filed, July 19, 1968, for Antidrip Saucer Device, now abandoned.

This application relates to antidrip devices and more particularly the device relates to antidrip devices for coffee cups.

It is an object of the invention to provide a novel antidrip saucer for cups whereby the saucer has raised ribbed areas for supporting the bottom of the cup above the bottom of the saucer so that any fluid collecting on the saucer from the cup will normally not contact the cup bottom.

It is a further object of the invention to provide a novel saucer for coffee cups and the like which will support the cup above the saucer and above the fluid as it may normally collect in the saucer.

Further objects and advantages of the invention will become apparent as the description proceeds and when taken in conjunction with the accompanying drawings wherein:

FIG. 1 is a side elevational view of the antidrip saucer invention with a coffee cup shown operatively positioned in the saucer.

FIG. 2 is a top plan view of the first form of the antidrip saucer invention.

FIG. 3 is a cross-sectional view of the first form of the antidrip saucer invention.

FIG. 4 is a top planned view of the second form of the antidrip saucer invention.

FIG. 5 is a cross-sectional view taken along line 5-5 of FIG. 4.

Figure 6:
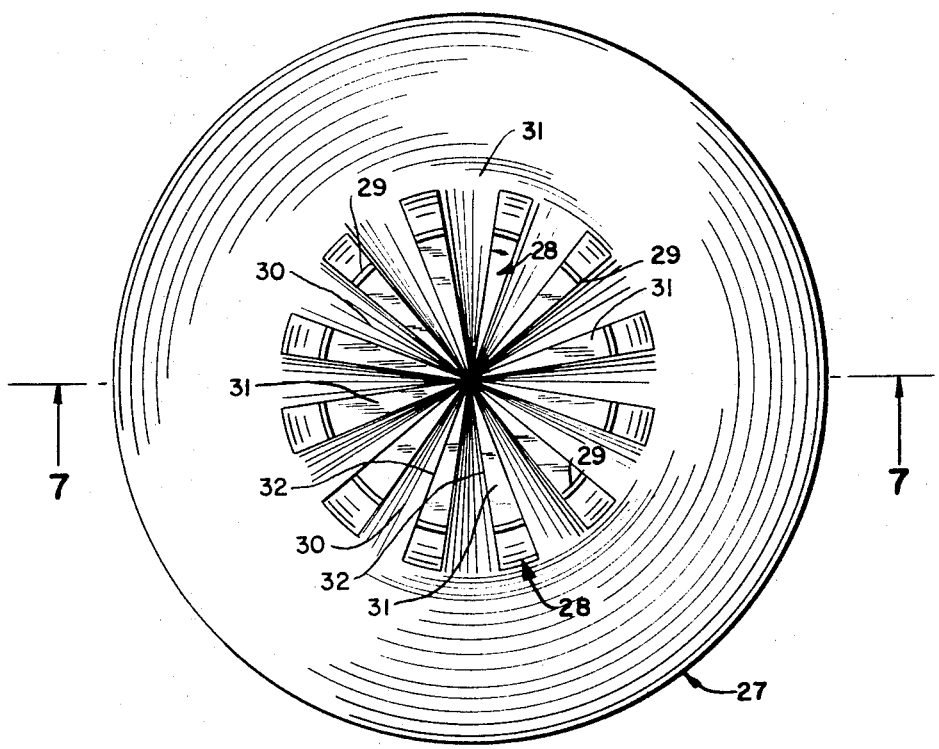
FIG. 6 is a top plan view of a third modified form of the invention.

Briefly stated, the invention comprises an antidrip saucer having a raised annular collar portion for surrounding a coffee cup with a plurality of projecting ribs projecting upwardly from the base of the saucer and acting to position the coffee cup beyond the reach of the fluid in the saucer.

Referring more particularly to the drawings in FIG. 1 the antidrip saucer invention 20 is illustrated with a conventional coffee cup 21 positioned in the saucer with the bottom 21' of the coffee cup resting upon the raised ribs 22 of the saucer 20. The raised ribs 22 project radially towards the center axis of the saucer and are fixed to the upper surface 23 of the center disc 26 of the saucer within the annular recess 25 formed in the center of the saucer. The raised ribs 22 are formed inwardly with the center disc portion 26 and an annular collar 24 is also formed inwardly with the raised ribs 22 and the center disc 26 and surrounds the lower side edges of the cup.

In FIGS. 2 and 3 the coffee cup 21 is shown in phantom lines positioned on the raised ribs 22 of the saucer invention 20 thereby providing a space between the bottom edge 21' of the coffee cup and the base 23 of the saucer for moisture, condensation and fluid dripping from the cup to collect therein without remaining in contact with the bottom edge of the cup so that when a person lifts the coffee cup from the saucer the collecting fluid will not be carried with it by the bottom edge of the cup. Also, the ribs 22 have a relatively sharp upper edge so that the cup may be rotated in the saucer with the ribs engaging in collecting any fluid on the bottom edge of the cup and intending to remove the drop of condensation from the cup and the modified form of the invention shown in FIGS. 4 and 5. The annular collar 24' is substantially identical to the annular collar 24 of the first form of the saucer invention. However, the ribs 22' are thicker and tapered upwardly and inwardly towards each other to form a triangular cross section so that the ribs 22' of the modified form of the invention shown in FIGS. 4 and 5.

Figure 7:
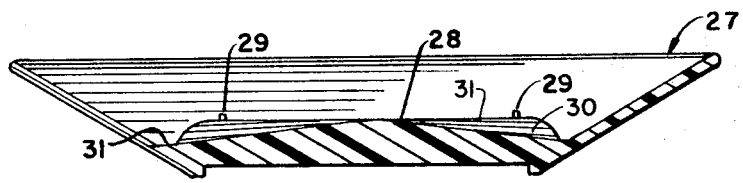
FIG. 7 is a cross-sectional view of the third modified form of the invention taken along line 7-7 of FIG. 6.

The subject matter being added by this continuation-in-part application is the third modified form of the invention 27 disclosed in FIGS. 6 and 7.

The third modified antidrip saucer 27 has a raised center area 28 for the cup to sit upon with further raised annular ridge or annular wall structure 29 which serves to keep the base of the coffee cup within the confines of the ridge structure 29.

The raised center area has a plurality of radially extending passageways and channels 30 which extend outwardly and are inclined downwardly away from the center of the saucer and cut into the raised center area 28 and through the annular ridge structure 29 at spaced intervals about the center axis of the dish. The downward inclination of the radial channels 30 tends to draw or gravitate any coffee which may have initially collected in the raised center area 28 away from the center of the cup to the intermediate annular portion 30 of the saucer.

The ridges 31 formed by the passageways 29 therebetween have relatively sharp edges 32 which will scrape against the bottom of the coffee cup and tend to remove any coffee drops clinging to the bottom of the cup.

Once the edge 32 has removed the drops of coffee, the coffee drops will tend to run down the inclined radial passageways 30 away and collect in the intermediate annular area 31 from the area where the base of the coffee cup rests, thus removing the coffee drops from the area where the cup will be set down so that coffee will not cling to the base of the coffee cup when it is picked up for drinking, and thus minimizes the possibility of coffee dripping from the base of the coffee cup onto the coffee drinker.

Thus, it will be seen that a novel antidrip saucer has been provided which will enable an operator to place his coffee cup in the saucer and the saucer will minimize the amount of condensation of food collecting on the saucer from being carried with the cup or when the cup is removed from the saucer.

It will be obvious that various changes and departures may be made to the invention without departing from the spirit and scope thereof and accordingly it is not intended that the invention be limited to that specifically described in the specification or as illustrated in the drawings but only as set forth in the appended claims.

What I claim is:

1. An antidrip saucer device for drinking cups comprising a raised annular center area, an annular flange surrounding said raised center area, said annular flange originating at and being fixed to the lower portion of said raised center area and extending outward and upward therefrom, said raised center area having a plurality of radially extending elongated channels extending radially outward and downward from substantially the center of the center area and forming raised ridges therebetween, said ridges each having elongated relatively sharp edge portions extending along the length of the ridges, a plurality of ribs on the ridges disposed annularly about the center of the center area and projecting upwardly therefrom, said ribs being spaced remote from the center area and adjacent the outer edges of the raised center area.